(12) United States Patent
Yaich

(10) Patent No.: US 7,322,297 B2
(45) Date of Patent: Jan. 29, 2008

(54) CANNELURED FRANGIBLE PROJECTILE AND METHOD OF CANNELURING A FRANGIBLE PROJECTILE

(75) Inventor: Daniel S. Yaich, Reynoldsville, PA (US)

(73) Assignee: International Cartridge Corporation, Reynoldsville, PA (US)

( * ) Notice: Subject to any disclaimer, the term of this patent is extended or adjusted under 35 U.S.C. 154(b) by 0 days.

(21) Appl. No.: 11/585,220

(22) Filed: Oct. 24, 2006

(65) Prior Publication Data

US 2007/0144395 A1  Jun. 28, 2007

Related U.S. Application Data

(62) Division of application No. 10/774,390, filed on Feb. 10, 2004, now Pat. No. 7,143,679.

(51) Int. Cl.
*F42B 30/02* (2006.01)

(52) U.S. Cl. .......................... 102/517; 86/54

(58) Field of Classification Search .................... 86/54, 86/55; 102/501, 516, 517, 518
See application file for complete search history.

(56) References Cited

U.S. PATENT DOCUMENTS

| | | | |
|---|---|---|---|
| 326,231 A | 9/1885 | Manning | |
| 1,149,485 A | 8/1915 | Wilcox | 86/54 |
| 1,447,478 A | 3/1923 | Koshollek et al. | 105/508 |
| 1,732,211 A * | 10/1929 | Olin et al. | 102/514 |
| 1,892,158 A * | 12/1932 | Matthews | 102/529 |
| 1,944,884 A | 1/1934 | Gerlich | |
| 2,105,528 A | 1/1938 | Foisy | |
| 2,349,677 A | 5/1944 | Reynolds | 86/54 |
| 2,409,307 A | 10/1946 | Patch et al. | |
| 2,411,862 A * | 12/1946 | Arnold | 102/493 |
| 2,928,348 A * | 3/1960 | Zisman et al. | 102/527 |
| 3,157,137 A * | 11/1964 | Burns, Jr. | 102/509 |
| 3,311,962 A * | 4/1967 | Burns, Jr. | 86/55 |
| 3,349,711 A * | 10/1967 | Julius et al. | 102/509 |
| 3,401,637 A * | 9/1968 | Briscoe | 102/501 |
| 3,735,578 A | 5/1973 | Wayson et al. | 57/119 |
| 3,838,497 A | 10/1974 | Rizzitano et al. | 228/212 |
| 3,918,364 A * | 11/1975 | Duer | 102/501 |
| 4,000,698 A * | 1/1977 | Corney | 102/522 |
| 4,336,756 A | 6/1982 | Schreiber | 102/516 |
| 4,342,141 A | 8/1982 | Graham et al. | 86/54 |
| 4,517,897 A | 5/1985 | Kneubuhl | 102/439 |
| 4,572,077 A * | 2/1986 | Antoine et al. | 102/439 |
| 4,788,915 A * | 12/1988 | Sauvestre | 102/439 |
| 4,811,666 A | 3/1989 | Lutfy | 102/501 |

(Continued)

OTHER PUBLICATIONS

MIT, Lathe, Nov. 25, 2001, web.archive.org., pp. 2 and 3.

(Continued)

*Primary Examiner*—Bret Hayes
(74) *Attorney, Agent, or Firm*—Bacon & Thomas, PLLC

(57) ABSTRACT

A method of canneluring a frangible projectile includes the steps of rotating the projectile at a high speed, and cutting the cannelure into the projectile to form a frangible cannelured projectile. To ensure that the body is not damaged during cutting, the cutting tool has bevels on each side of a square, generally flat, cutting surface. A frangible cannelured projectile made by the foregoing method includes a groove having a generally flat base and beveled edges.

6 Claims, 2 Drawing Sheets

U.S. PATENT DOCUMENTS

| | | | | |
|---|---|---|---|---|
| 4,939,996 | A * | 7/1990 | Dinkha et al. | 102/501 |
| 5,020,439 | A * | 6/1991 | Winter et al. | 102/518 |
| 5,079,986 | A | 1/1992 | Lee | 86/39 |
| 5,105,514 | A | 4/1992 | Bilsbury et al. | 29/1.2 |
| 5,122,311 | A | 6/1992 | Sims et al. | 264/109 |
| 5,214,237 | A | 5/1993 | McArthur | 102/501 |
| 5,259,320 | A | 11/1993 | Brooks | 102/509 |
| 5,274,108 | A | 12/1993 | Dyson et al. | 548/311.1 |
| 5,275,108 | A | 1/1994 | Chernicky et al. | 102/439 |
| 5,301,436 | A | 4/1994 | Johnston | 33/506 |
| 5,535,495 | A | 7/1996 | Gutowski | 86/54 |
| 5,917,143 | A | 6/1999 | Stone | 102/506 |
| 6,090,178 | A * | 7/2000 | Benini | 75/245 |
| 6,182,574 | B1 * | 2/2001 | Giannoni | 102/516 |
| 6,257,149 | B1 * | 7/2001 | Cesaroni | 102/515 |
| 6,263,798 | B1 * | 7/2001 | Benini | 102/430 |
| 6,536,352 | B1 | 3/2003 | Nadkarni et al. | 102/506 |
| 6,553,667 | B1 | 4/2003 | West | 29/896.412 |
| 6,691,623 | B1 | 2/2004 | Stone | 102/506 |
| 6,694,888 | B2 | 2/2004 | Jopson et al. | 102/506 |
| 6,892,647 | B1 * | 5/2005 | Stone | 102/506 |
| 6,973,879 | B1 * | 12/2005 | McElroy et al. | 102/514 |
| 2001/0050020 | A1 | 12/2001 | Davis et al. | |
| 2003/0101891 | A1 | 6/2003 | Amick | |
| 2004/0089186 | A1 | 5/2004 | Brygdes-Price | 102/502 |

OTHER PUBLICATIONS

The Cartridge Collector's Glossary-Illustrated, IAA, 2001.
Sigurd Berg, Hakan Thoors, Bertil Steen; Machining of Powder Metallurgy Materials; ASM; ASM Handbook vol. 07: Powder Metal Technologies and Applications; 681-687; ISBN 0-87170-387-4.

* cited by examiner

CANNELURED FRANGIBLE PROJECTILE AND METHOD OF CANNELURING A FRANGIBLE PROJECTILE

This application is a Division of nonprovisional application Ser. No. 10/774,390, filed Feb. 10, 2004, now U.S. Pat. No. 7,143,679.

BACKGROUND OF THE INVENTION

1. Field of the Invention

This invention relates to a frangible projectile, and in particular to a frangible projectile having a cannelure. The invention also relates to a method of canneluring a frangible projectile.

2. Description of Related Art

*The Cartridge Collector's Glossary-Illustrated*, published by International Ammunition Association, 2001, and made available on their website, defines a "cannelure" as "the circumferential swaged, machined or milled groove(s) around a bullet (for sealing; also often for identification) to a cartridge case." The cannelure is used, for example, as a guide during crimping of a small arms cartridge to the bullet, and/or for retaining a lubricant. While bullets can be secured to cartridges without using cannelures, cannelures are preferred in many cases because they provide a more secure, accurate, and efficient way of attaching the cartridge to the projectile.

A variety of conventional bullets or other projectiles including cannelures are disclosed in U.S. Pat. Nos. 5,259,320; 5,275,108; 5,105,514; 5,079,986; 4,811,666; 4,517,897; 4,336,756; 2,409,307; 1,944,884; and 326,231.

While canneluring is well-known in the context of conventional projectiles, it has heretofore been impractical to provide cannelures in frangible projectiles, which are designed to break apart upon impact, rather than penetrating the target. Conventional machining or milling techniques tend to fracture or weaken the projectile, which is typically made of a compressed powder rather than solid material.

Frangible projectiles are generally lighter than conventional projectiles, and are often used as practice rounds on firing ranges or in situations where non-lethal force is required. To achieve disintegration, frangible projectiles are conventionally made of powdered and compressed materials, rather than solid metal. Originally made of lead powders, frangible projectiles have more recently been made of less toxic materials such as compressed copper and tin powders.

Cannuluring of frangible projectiles is desirable for the same reasons that apply to other types of projectiles, including secure and simple attachment of cartridge shells, identification, and lubrication. Nevertheless, there have only been a few attempts to provide cannelured projectiles, and none has proven practical for mass-market civilian applications. Examples of conventional frangible projectiles that lack cannelures are disclosed in U.S. Published Patent Application Nos. 2003/0101891 and 2001/0050020 and U.S. Pat. No. 6,536,352.

An early attempt at canneluring a frangible projectile is disclosed in U.S. Pat. No. 2,105,528, which is specifically directed to a small arms projectile for use in shooting galleries, including a "grease groove" corresponding to the cannelure of a conventional projectile. However, the method disclosed in this patent can only be used with lead powder mixtures, and is in any case unsuitable for use with modern frangible projectiles, since it involves hardening the projectile before forming the cannelure by crimping or swaging.

Another "frangible" projectile with a cannelure is disclosed in U.S. Pat. No. 5,442,989. The projectile includes a penetrating rod and incendiary component, with the body of the projectile being arranged not only to disintegrate upon contact, but to disintegrate into granules that are propelled outwardly "in every direction with great energy" in order to increase the damage caused by the projectile prior to penetration. The cannelure is used to hold a rotator band or ring for engaging the rifling of a gun barrel, the groove being molded into the body of the projectile prior to sintering. Again, the method disclosed in this patent is not suitable for application to frangible projectiles of the type intended for general use, because it requires hardening of the projectile after molding the groove into the body of the projectile.

There is consequently a long-felt need for a method that enables cannelures to be formed in frangible powdered metal type projectiles intended for general use.

SUMMARY OF THE INVENTION

It is accordingly an objective of the invention to provide a method of canneluring a frangible projectile.

It is a further objective of the invention to provide a method of canneluring a frangible projectile, without the need to harden the projectile, and which is suitable for use with powdered metal compositions, including lead-free compositions.

It is also an objective of the invention to provide a frangible projectile made of a compressed powdered material, and that includes a cannelure.

These objectives are achieved by a method of making a projectile including the steps of rotating the projectile at a high speed, and cutting the cannelure into the projectile using a specially shaped cutting tool having a generally flat cutting surface and beveled edges.

A particular advantage of being able to cannelure a projectile that is frangible is that the cannelure acts as a perforation, which causes the projectile to break during attempts to remove the projectile from the cartridge into which it is crimped, thereby discouraging separation of the cartridge from the projectile.

The term "frangible projectile" as used herein refers to the property of disintegrating upon contact with a target, rather than penetrating the target. It is not intended to include projectiles, sometimes also referred to as frangible, that are hardened or equipped with a solid metal rod for penetration, but contain an explosive charge that causes disintegration or fragmentation upon entry into the target.

DETAILED DESCRIPTION OF THE PREFERRED EMBODIMENTS

Figure 1:
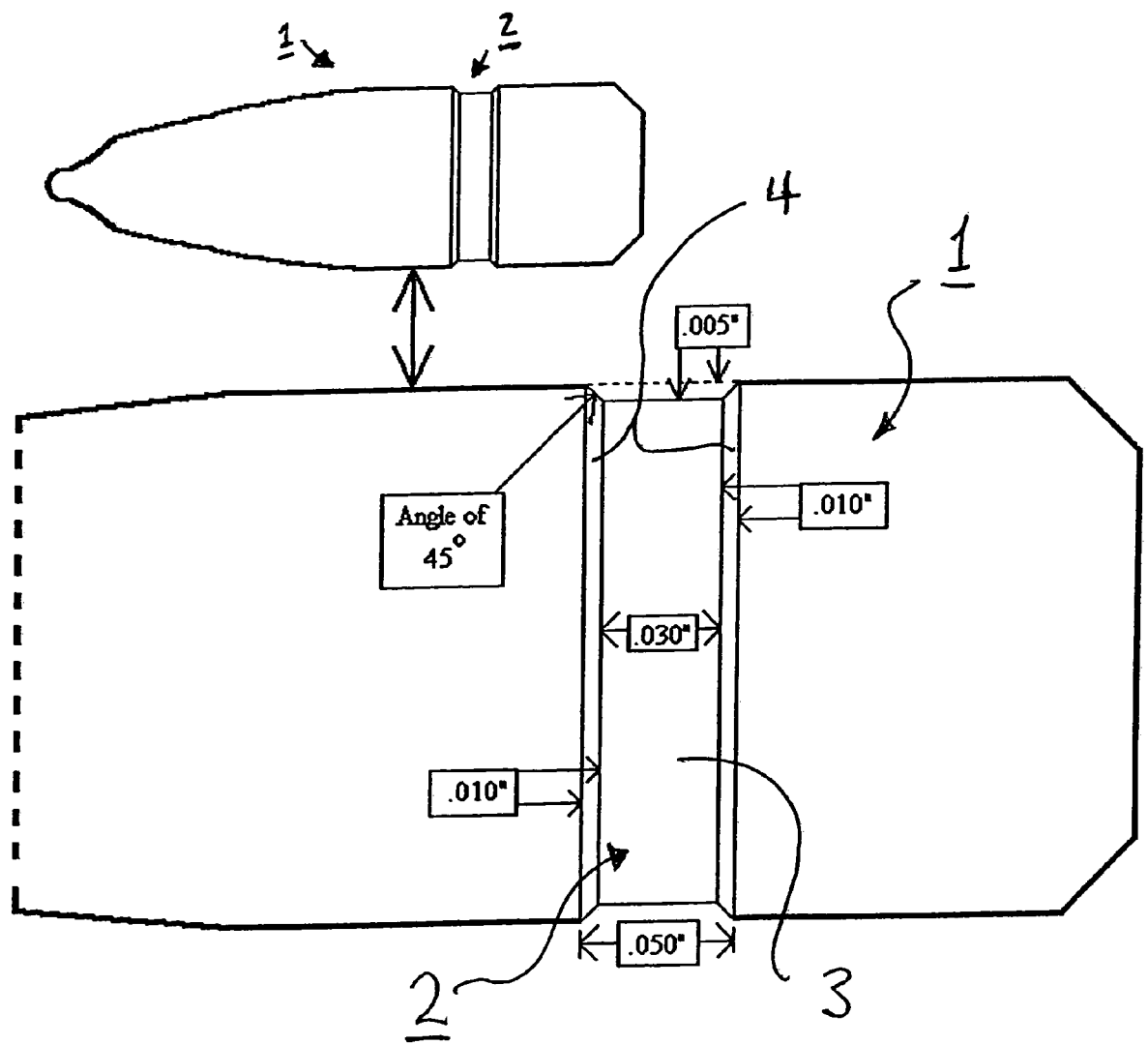
FIG. 1 is a side view of a cannelured frangible projectile made by the method of the invention.

As illustrated in FIG. 1, a projectile made by the method of the invention includes a frangible projectile body 1 having a cannelure 2 and an otherwise conventional shape. Body 1 is made of a lead-free compressed powder mixture such as copper powder and tin powder.

It will be appreciated by those skilled in the art that the material of the projectile may be entirely conventional, and that the invention is not to be limited to a particular material, so long as the projectile is frangible. For reasons of toxicity, lead-free compositions are preferred, although the method of the invention could also be applied to lead-containing frangible projectiles, and to projectiles containing other materials or substances.

Due to the use of a special cutting tool, described below, which prevents the body from being weakened or damaged during cannelure formation, the preferred projectile illustrated in FIG. 1 includes a generally flat base 3 and beveled sides 4.

Dimensions of the groove for a typical small arms powered copper-tin projectile or bullet, including but not limited to a .223 caliber bullet (0.223" or 5.56 mm), are 0.002" deep by 0.030" wide at the base. The angle of the bevel is 45 degrees so that the top of the groove has a width of 0.050 inches. The axial position of the groove will depend on the specific application, including the type of cartridge in which the projectile is to be secure, while the width and depth of the groove, as well as the angle of the bevel, may also be varied depending on the caliber of the projectile, the application in which it is to be used, and the exact composition of the projectile material.

Although projectiles made by the method of the invention need not necessarily have this property, the illustrated cannelure has the further advantage of acting as a perforation to cause the projectile to break during attempts to remove the projectile from the cartridge into which it is crimped, thereby discouraging separation of the cartridge from the projectile in order to ensure proper handling and use of the cartridge.

Figure 2:
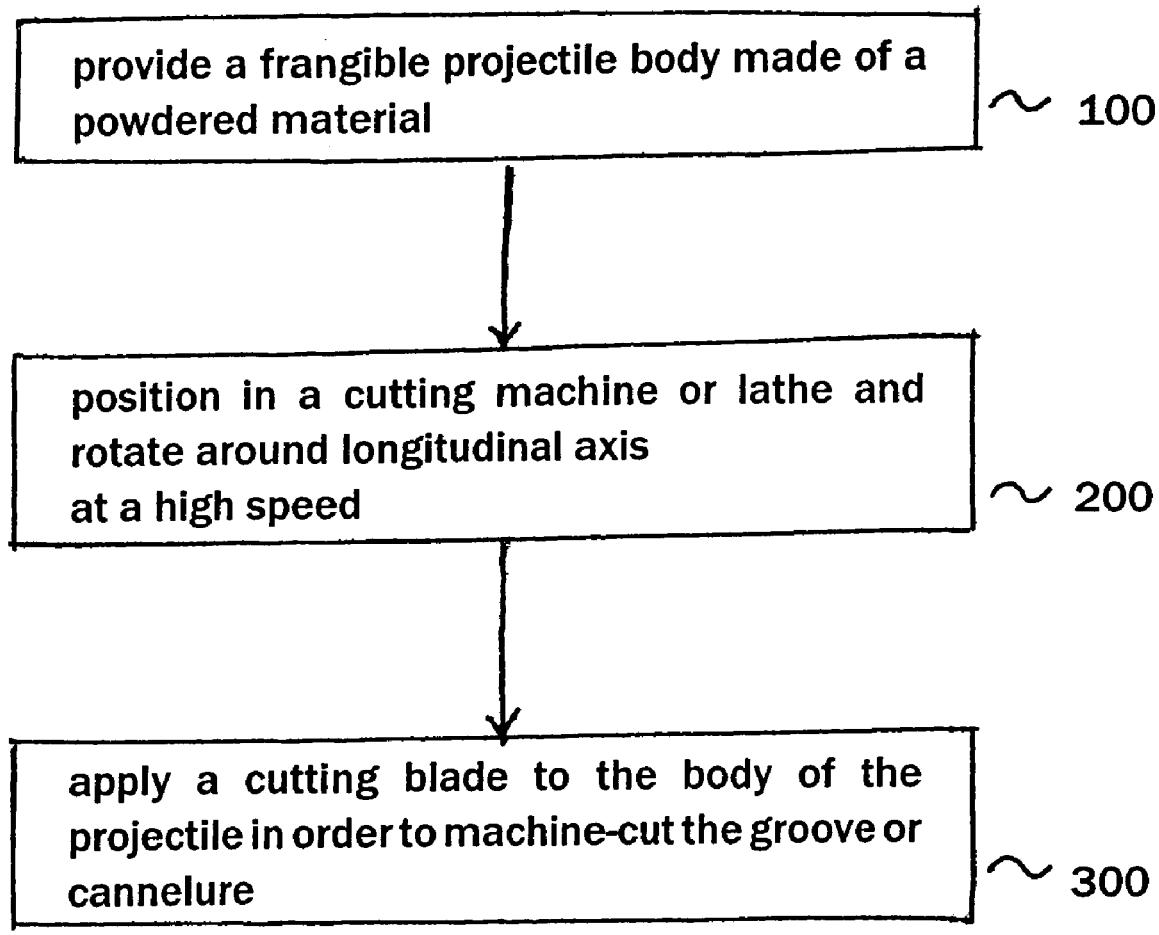
FIG. 2 is a flowchart illustrating a method of canneluring a frangible projectile, according to a preferred embodiment of the invention.

The first step of the method of the invention, as illustrated in FIG. 2, is to position, in a cutting machine, a projectile that has been made by compressing a powdered material to form a frangible projectile body (step 100). The pre-cannelured projectile body itself is entirely conventional and forms no part of the present invention.

The projectile is then rotated around its longitudinal or cylindrical axis at a high speed (step 200). Finally, a properly dimensioned cutting blade is applied to the body of the projectile in order to machine-cut the groove or cannelure (step 300).

A conventional cutting tool will fracture the frangible projectile. Therefore, the cutting tool used in the preferred method has beveled edges and a square or rectangular cutting surface corresponding to the shape of the groove 2 illustrated in FIG. 1. In particular, the cutting tool used in the method of the invention may have, by way of example and not limitation, a width 0.050" with 45 degree bevels on each lateral edge of the cutting surface. Each bevel is 0.010"× 0.010", and the cutting tool preferably has a square cutting surface having a width of 0.030". Although the invention is not limited to the illustrated dimensions, the width of the cut resulting from the above tool is 0.050"+/−0.008" and the depth of the cut is 0.0021"+/−0.010". As indicated above, the position of the cannelure on the projectile depends on the overall length of the loading specifications for the finished cartridge.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A frangible bullet having a cannelure, consisting of:
  a body made of a compressed powdered metal material that disintegrates upon contact with an object; and
  a cannelure cut into the compressed powered metal material, wherein the cannelure includes beveled edges and a generally flat base.

2. A frangible bullet as claimed in claim 1, wherein the beveled edges are at an approximately 45 degree angle relatively to a flat base of the cannelure.

3. A frangible bullet as claimed in claim 1, wherein the compressed powdered metal material comprises a lead-free powder material.

4. A frangible bullet as claimed in claim 3, wherein the compressed powdered metal material comprises a copper tin powder mixture.

5. A frangible bullet as claimed in claim 1, wherein the bullet is a small arms bullet.

6. A frangible bullet as claimed in claim 5, wherein the bullet is a rifle bullet and the cannelure is arranged to be crimped to a cartridge.

* * * * *